(12) United States Patent
Player et al.

(10) Patent No.: US 9,894,150 B2
(45) Date of Patent: Feb. 13, 2018

(54) ACCURATE GENERATION OF MULTIPLE DIMENSIONS OF COMPUTER LOAD

(71) Applicant: Spirent Communications, Inc., Sunnyvale, CA (US)

(72) Inventors: Timmons Player, Cary, NC (US); David Joyner, Raleigh, NC (US)

(73) Assignee: SPIRENT COMMUNICATIONS, INC., Sunnyvale, CA (US)

(*) Notice: Subject to any disclaimer, the term of this patent is extended or adjusted under 35 U.S.C. 154(b) by 223 days.

(21) Appl. No.: 14/871,676

(22) Filed: Sep. 30, 2015

(65) Prior Publication Data

US 2017/0093962 A1    Mar. 30, 2017

(51) Int. Cl.
| | |
|---|---|
| *H04L 29/08* | (2006.01) |
| *G06F 11/34* | (2006.01) |
| *G06F 9/50* | (2006.01) |
| *H04L 12/24* | (2006.01) |
| *H04L 12/911* | (2013.01) |

(52) U.S. Cl.
CPC ........ *H04L 67/1002* (2013.01); *G06F 9/5083* (2013.01); *G06F 11/3414* (2013.01); *G06F 11/3433* (2013.01); *H04L 41/20* (2013.01); *H04L 47/70* (2013.01)

(58) Field of Classification Search
CPC ..... H04L 67/1002; H04L 47/70; H04L 41/20; G06F 11/3413; G06F 11/3433; G06F 9/5083; G06F 11/3414

See application file for complete search history.

(56) References Cited

U.S. PATENT DOCUMENTS

| | | | |
|---|---|---|---|
| 2005/0193258 A1* | 9/2005 | Sutton ................ | G06F 11/3409 714/32 |
| 2014/0068335 A1 | 3/2014 | Bromley et al. | |

(Continued)

OTHER PUBLICATIONS

Zhang, Pingyo et al, "Automatic generation of load tests", Automated Softward Engineering (ASE), 2011 26th IEEE/ACM International Conference On, IEEE, Nov. 6, 2011 (Nov. 6, 2011), pp. 43-52.

(Continued)

*Primary Examiner* — Brian J Gillis
*Assistant Examiner* — Amy Ling
(74) *Attorney, Agent, or Firm* — Haynes Beffel & Wolfeld LLP; Ernest J. Beffel, Jr.; Andrew L. Dunlap

(57) ABSTRACT

A utilization test generates the multiple dimensions of resource load on the first computer, the multiple dimensions including at least two of: a processor utilization dimension, a main memory utilization dimension, a mass storage utilization dimension, and a network utilization dimension. The utilization test performs iterations of attempts to generate said each dimension of the resource load on the first computer, in an amount equal to a changeable target utilization of said each dimension of the resource load on the first computer. The utilization test adjusts the adjusted utilization to attempt to correct for inequality between (i) the actual utilization of a particular one of the multiple dimensions of the resource load on the first computer, and (ii) the changeable target utilization of the particular one of the multiple dimensions of the resource load on the first computer.

24 Claims, 11 Drawing Sheets

(56) References Cited

U.S. PATENT DOCUMENTS

2015/0192907 A1* 7/2015 Blevins .................. G05B 17/02
　　　　　　　　　　　　　　　　　　　700/11
2017/0155724 A1* 6/2017 Haddad .................. H04L 67/16

OTHER PUBLICATIONS

PCT/US2016/055003—International Search Report and Written Opinion dated Dec. 22, 2016, 12 pages.
PCT/US2016/055003—International Preliminary Report on Patentability dated Aug. 28, 2017, 38 pages.
PCT/US2016/055003—Response (Article 34) to Written Opinion dated Dec. 22, 2016, filed Jul. 28, 2017, 17 pages.

* cited by examiner

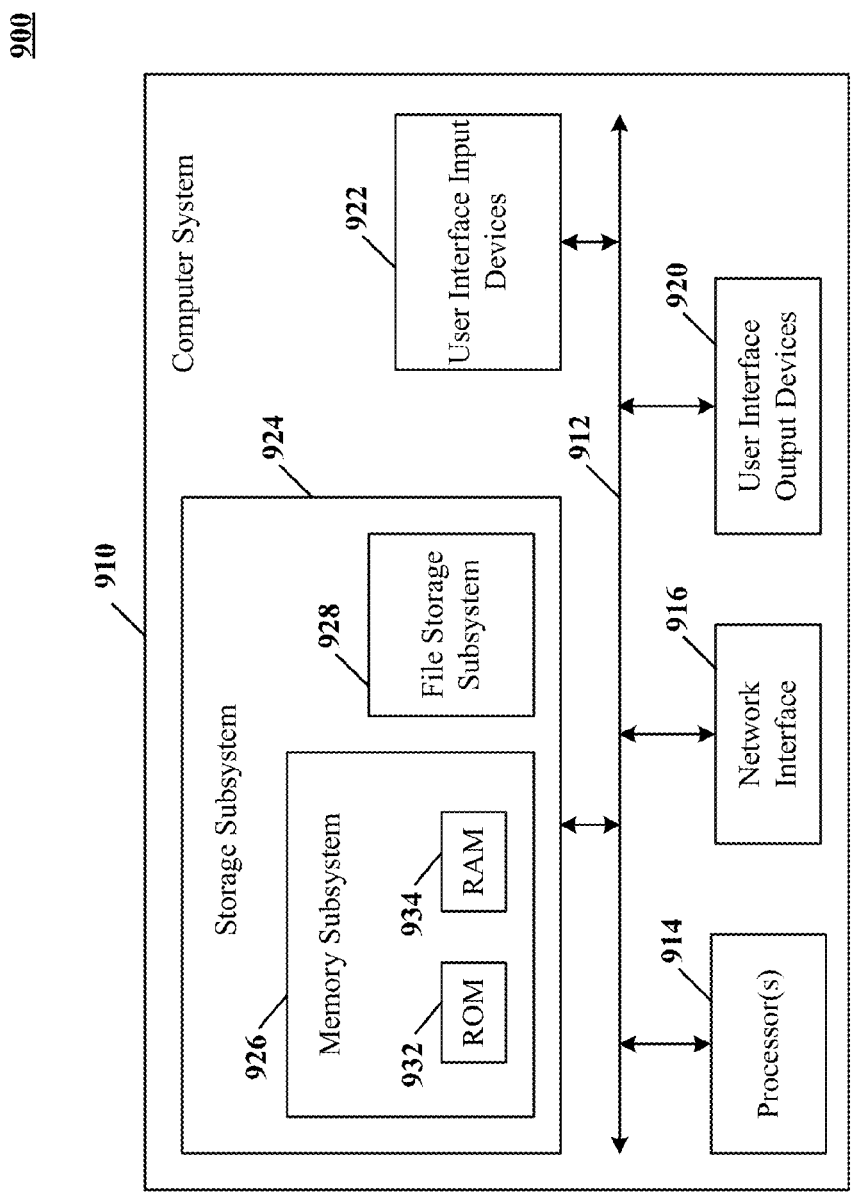
FIG. 14 – Computer System

ACCURATE GENERATION OF MULTIPLE DIMENSIONS OF COMPUTER LOAD

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

Load generators can create a maximum load to measure a maximum resource load capacity of a computer. However, existing load generators do not allow the creation of an arbitrary load. Also, existing load generators run a battery of tests and can assign a single metric to computer resource availability. However, existing load generators do not allow the fine-grained measurement of different types of computer resources, and in particular at arbitrary loads.

Accordingly, an opportunity arises to develop a load generator that helps determine resource load capacity of different types of computer resources at arbitrary levels.

SUMMARY

One aspect of the technology is a method of adjustably generating multiple dimensions of computer resource load to test capacity of the multiple dimensions of the computer resource load.

A utilization test generates the multiple dimensions of resource load on the first computer, the multiple dimensions including at least two of: a processor utilization dimension, a main memory utilization dimension, a mass storage utilization dimension, and a network utilization dimension. The utilization test performs iterations of attempts to generate said each dimension of the resource load on the first computer, in an amount equal to a changeable target utilization of said each dimension of the resource load on the first computer. The utilization test adjusts the load generated to attempt to correct for inequality between (i) the actual utilization of a particular one of the multiple dimensions of the resource load on the first computer, and (ii) the changeable target utilization of the particular one of the multiple dimensions of the resource load on the first computer.

Other features and aspects of the technology disclosed appear in the drawings, specification and claims that follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 14 is a block diagram of an example computer system.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Figure 1:
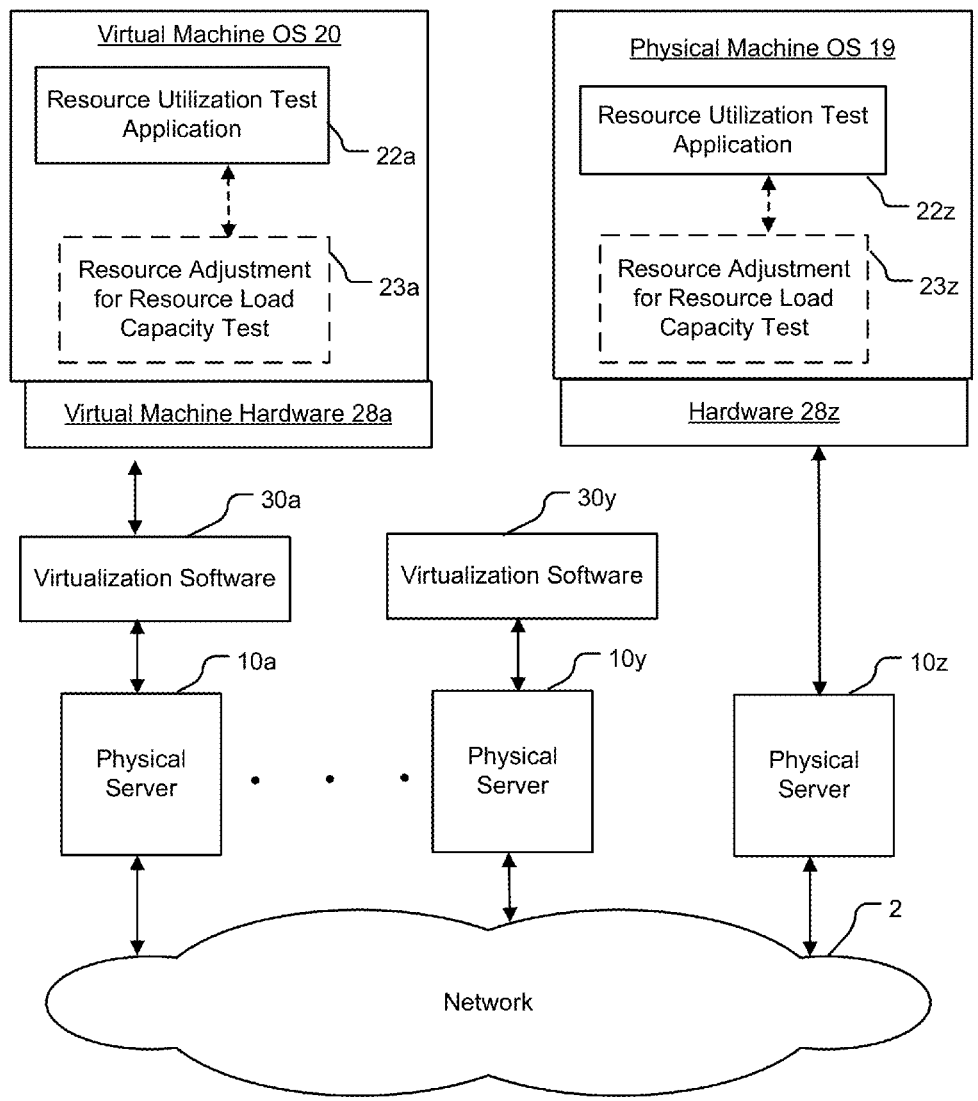
FIG. 1 is a block diagram that illustrates example environments for running a resource utilization test.

FIG. 1 is a block diagram that illustrates example environments for running a resource utilization test.

A virtual machine operating system 20, or virtual machine instance, runs on virtual machine hardware 28a allotted to the virtual machine operating system 20. Virtual machine operating system 20 is managed by virtualization software 30a executing on physical server 10a. Virtualization software 30a can also manage additional virtual machines. Virtualization software 30a can be native or hosted, and manages one or more virtual machines, permitting multiple concurrent instances of operating systems on the same computer hardware resources. The computer hardware resources include physical servers 10a to 10z, interconnected by network 2 shown as a network cloud. Physical servers 10a to 10z include processors, memories, and non-transitory computer readable media with computer readable instructions executable by a computer performing the technology described herein. Any number of servers 10a-10z may reside on network 2, and any number of virtual machines 20 may reside on each physical server 10a-10z. For example, virtualization software 30y is executing on physical server 10y, and physical server 10z does not have executing virtualization software.

Virtual machine operating system 20 is an environment in which resource utilization test application 22a executes. Resource utilization test application 22a performs resource adjustment for resource load capacity test 23a. Examples of different types, or dimensions of resource load that are adjusted, include a CPU or process utilization dimension, a main memory utilization dimension, a mass storage utilization dimension, and a network utilization dimension.

Physical server 10z does not have executing virtualization software. Resource adjustment for resource load capacity test 23z functions in a manner similar to resource adjustment for resource load capacity test 23a, but in a non-virtual context on physical machine operating system 19.

FIGS. 2-5 are simplified block diagrams which show the resource utilization test application running on a general purpose operating system or on a unikernel.

Figure 2:
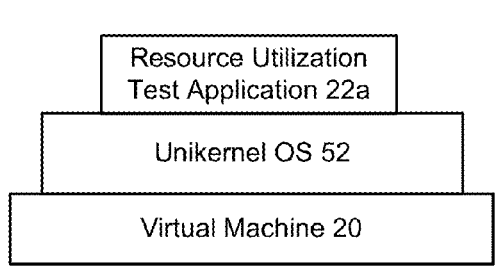
FIGS. 2-5 are simplified block diagrams which show the resource utilization test application running on a general purpose operating system or on a unikernel.

FIG. 2 shows a virtual machine instance 20, supporting a unikernel operating system 52. Unikernel operating system 52 provides a single address space which allows inspection of any aspect of the operating system. Accordingly, unikernel operating system 52 helps guarantee accuracy of the load generation performed by resource utilization test application 22a.

Figure 3:
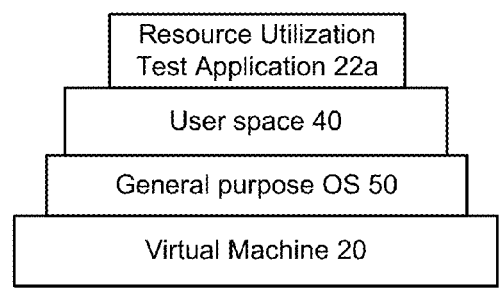

FIG. 3 shows a virtual machine instance 20, supporting a general purpose operating system 50. General purpose operating system 50 provides user space 40 with multiple address spaces including an address space with the Resource Utilization Test Application 22a, which obscures inspection of aspects of the operating system. Accordingly, general purpose operating system 50 obstructs accuracy of the load generation performed by resource utilization test application 22a. Nevertheless, resource utilization test application 22a is an improved load generator compared to alternatives in general purpose operating system 50.

Figure 4:
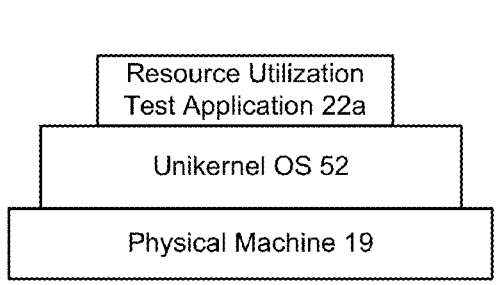
Figure 5:
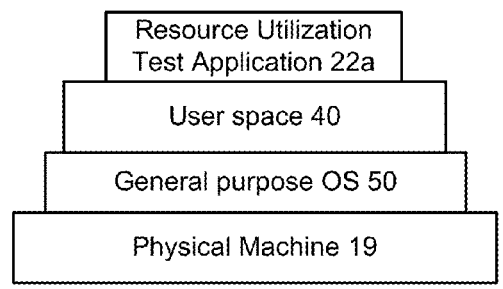

FIG. 4 is similar to FIG. 2 except that a physical machine 19 rather than a virtual machine supports unikernel operating system 52. FIG. 5 is similar to FIG. 3 except that a physical machine 19 rather than a virtual machine supports general purpose operating system 50.

Figure 6:
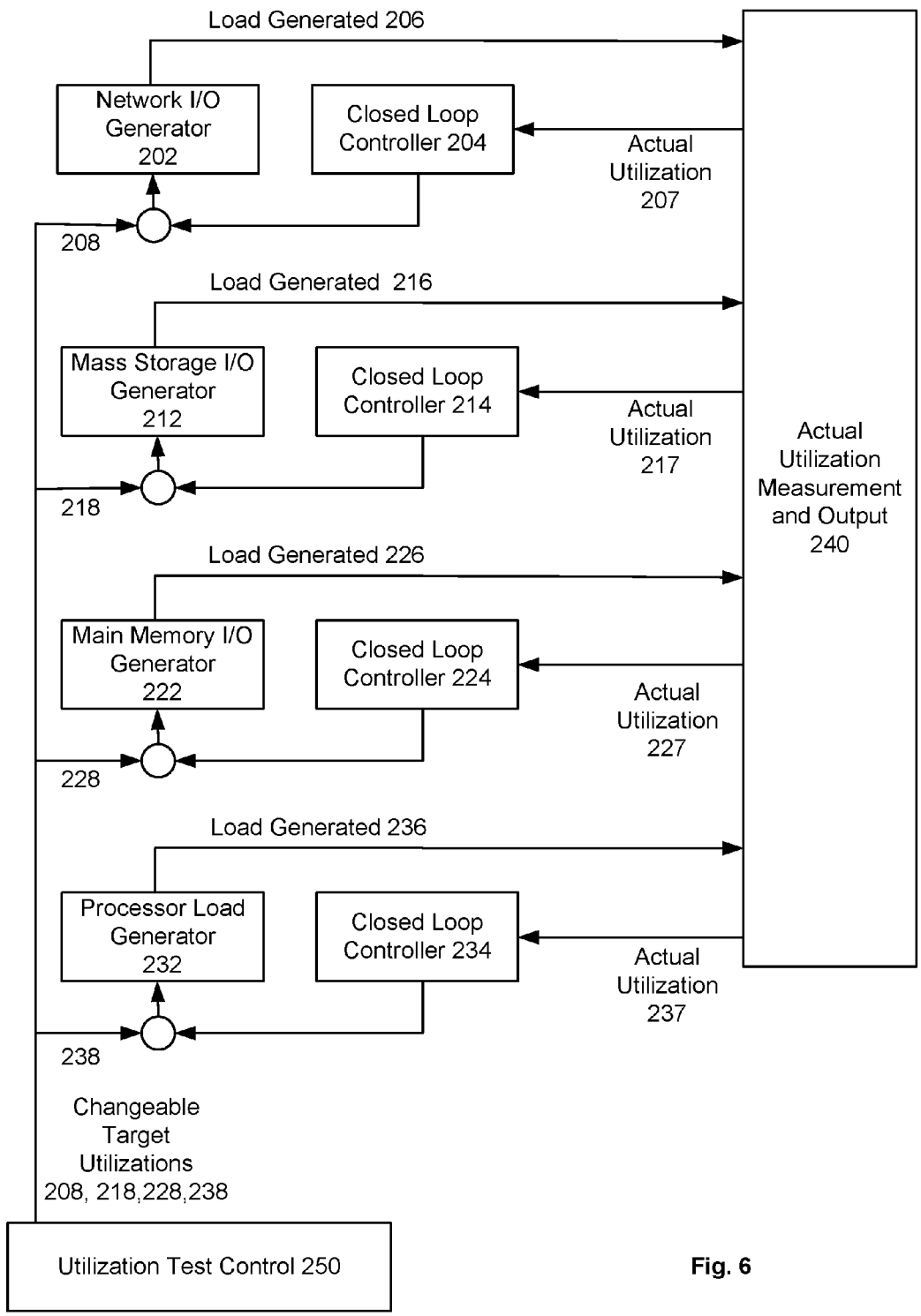
FIG. 6 is an example block diagram of a utilization test application with multiple closed loops to generate desired levels of resource load.

FIG. 6 is an example block diagram of a utilization test application with multiple closed loops to generate desired levels of resource load.

Utilization test control 250 generates changeable target utilizations 208, 218, 228, and 238 for the different dimensions of resource load. The changeable target utilizations 208, 218, 228, and 238 can be manually specified by a user, or generated automatically by the utilization test application. Automatically generated changeable target utilizations 208, 218, 228, and 238 can cycle through a range of values to perform the utilization test application multiple times.

Network I/O generator 202 generates network utilization dimension resource load, such as one or more of: transmit packets per second and transactions per second. The amount of network utilization dimension resource load generated by the network I/O generator 202 is referred to as load generated 206. Load generated 206 is initially equal to the changeable target utilization 208. Actual utilization 207 is the amount of resource load for the network utilization dimension that is actually generated on the computer. Actual utilization 207 is different from load generated 206, because actual utilization 207 for the network utilization dimension on the computer includes contributions in addition to load generated 206 generated by network I/O generator 202. After actual utilization 207 is measured by actual utilization measurement and output 240, actual utilization 207 is provided to closed loop controller 204. Responsive to the actual utilization 207, closed loop controller 204 changes the load generated 206, in an attempt to make the actual utilization 207 equal to changeable target utilization 208.

The other 3 loops are similar, but are described for completeness.

Mass storage I/O generator 212 generates mass storage utilization dimension resource load, such as one or more of: read operations per second and write operations per second. The amount of mass storage dimension resource load generated by the mass storage I/O generator 212 is referred to as load generated 216. The load generated 216 is initially equal to the changeable target utilization 218. Actual utilization 217 is the amount of resource load for the mass storage utilization dimension that is actually generated on the computer. Actual utilization 217 is different from load generated 216, because actual utilization 217 for the mass storage utilization dimension on the computer includes contributions in addition to load generated 216 generated by mass storage I/O generator 212. After actual utilization 217 is measured by actual utilization measurement and output 240, actual utilization 217 is provided to closed loop controller 214. Responsive to the actual utilization 217, closed loop controller 214 changes the load generated 216, in an attempt to make the actual utilization 217 equal to changeable target utilization 218.

Main memory I/O generator 222 generates main memory utilization dimension resource load, such as one or more of: read operations per second and write operations per second. The amount of main memory utilization dimension resource load generated by the main memory I/O generator 222 is referred to as load generated 226. The load generated 226 is initially equal to the changeable target utilization 228. Actual utilization 227 is the amount of resource load for the network utilization dimension that is actually generated on the computer. Actual utilization 227 is different from load generated 226, because actual utilization 227 for the main memory utilization dimension on the computer includes contributions in addition to load generated 226 generated by main memory I/O generator 222. After actual utilization 227 is measured by actual utilization measurement and output 240, actual utilization 227 is provided to closed loop controller 224. Responsive to the actual utilization 227, closed loop controller 224 changes the load generated 226, in an attempt to make the actual utilization 227 equal to changeable target utilization 228.

Processor or CPU load generator 232 generates processor utilization dimension resource load, such as one or more of: CPU seconds used and CPU seconds total. The amount of processor utilization dimension resource load generated by the processor generator 232 is referred to as load generated 236. The load generated 236 is initially equal to the changeable target utilization 238. Actual utilization 237 is the amount of resource load for the processor load utilization dimension that is actually generated on the computer. Actual utilization 237 is different from load generated 236, because actual utilization 237 for the processor utilization dimension on the computer includes contributions in addition to load generated 236 generated by processor load generator 232. After actual utilization 237 is measured by actual utilization measurement and output 240, actual utilization 237 is provided to closed loop controller 234. Responsive to the actual utilization 237, closed loop controller 234 changes the load generated 236, in an attempt to make the actual utilization 237 equal to changeable target utilization 238.w Closed loop controllers 204, 214, 224, and 234 can be implemented in hardware or software or a combination. More generally, closed loop controller 204, 214, 224, and 234 can perform cascade compensation or feedback compensation. Examples of cascade compensation are proportional plus integral (PI) control, proportional plus derivative (PD) control, and proportional plus integral plus derivative (PID) control. Examples of tuning the closed loop are manual tuning, Ziegler-Nichols tuning, Tyreus Luyben tuning, software tool tuning, and Cohen-Coon tuning.

Although the example of the utilization test application shows 4 dimensions of resource load, other examples can include 3, 2, 1, or more than 4. Other example can divide a particular dimension of resource load into different characteristics of the particular dimension of resource load.

Figure 7:
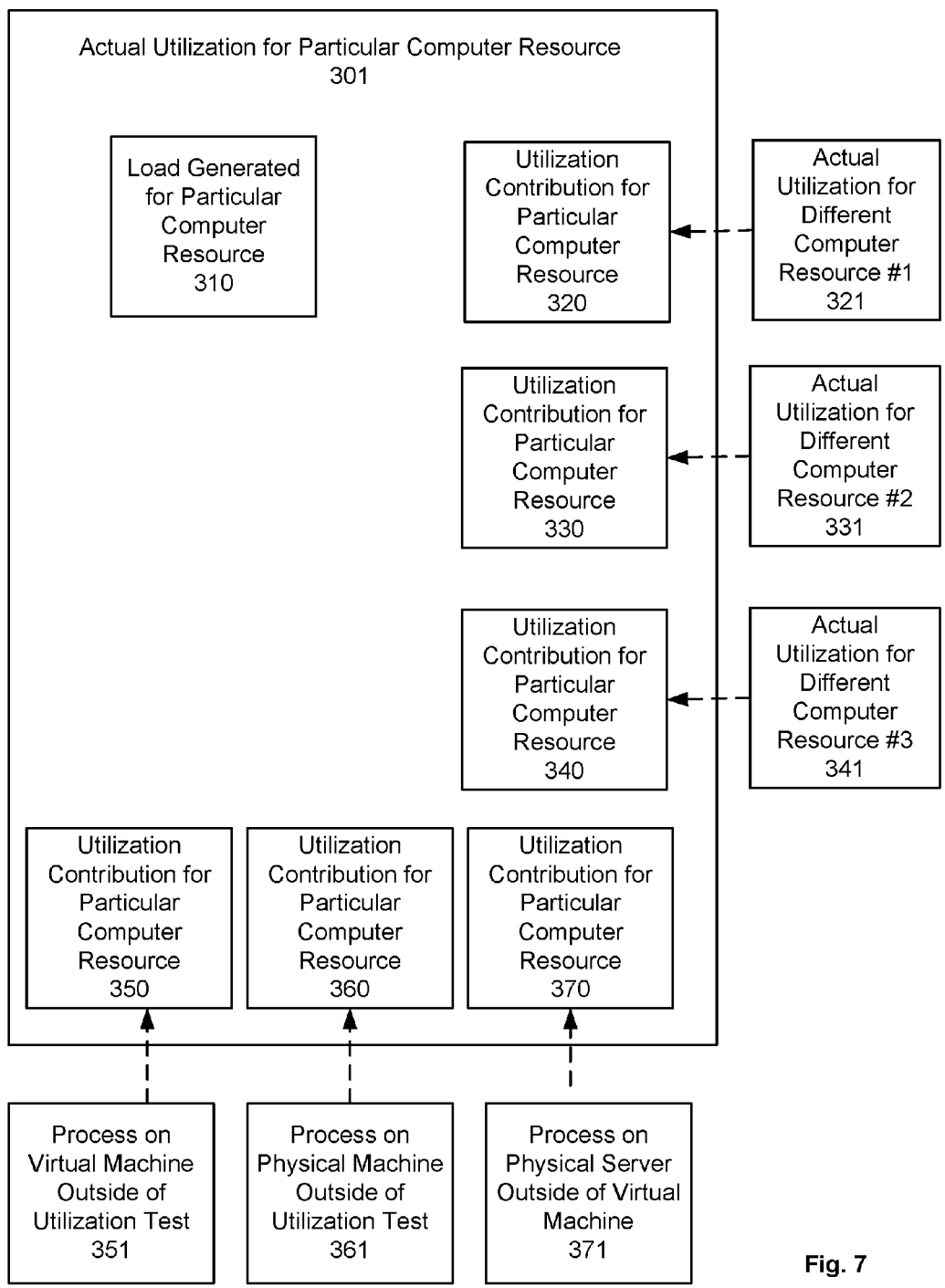
FIG. 7 is a simplified representation of different components that comprise an actual utilization of a particular computer resource.

FIG. 7 is a simplified representation of different components that comprise an actual utilization of a particular computer resource.

Actual utilization for a particular computer resource 301 can be, for example, actual utilization 207, 217, 227, or 237 on FIG. 6. Actual utilization includes not just the load generated for the particular computer resource 310, but additional utilization contributions. The load generated for a particular computer resource 301 can be, for example, load generated 206, 216, 226, or 236 on FIG. 6.

Several shown contributions occur from load generator closed loops for other dimensions of computer load. For example, in an example where the actual utilization for a particular computer resource 301 is actual utilization 237 for the processor load dimension, additional contributions to the processor load dimension of computer load come from load generator closed loops for the network utilization dimension, the mass storage utilization dimension, and/or the main memory utilization dimension. Such additional contributions are shown as utilization contributions for the particular computer resource (e.g., processor load dimension) 320, 330, and 340, which respectively occur from actual utilization for different computer resource #1 321 (e.g., network utilization dimension), actual utilization for different computer resource #2 331 (e.g., mass storage dimension), and actual utilization for different computer resource #3 341 (e.g., main memory utilization dimension).

Other shown contributions occur from outside of the utilization test or even from outside the computer altogether. Utilizations for the particular computer resource 350, 360, and 370 respectively occur from a process on the virtual machine outside of the utilization test 351, a process on the physical machine outside of the utilization test 361, and a process on the physical server outside of the virtual machine 371. Strictly speaking, the process on the virtual machine outside of the utilization test 351, the process on the physical machine outside of the utilization test 361, and the process on the physical server outside of the virtual machine 371 can represent ceilings on resource availability. However, such ceilings can be accounted for by negative contributions.

Figure 8:
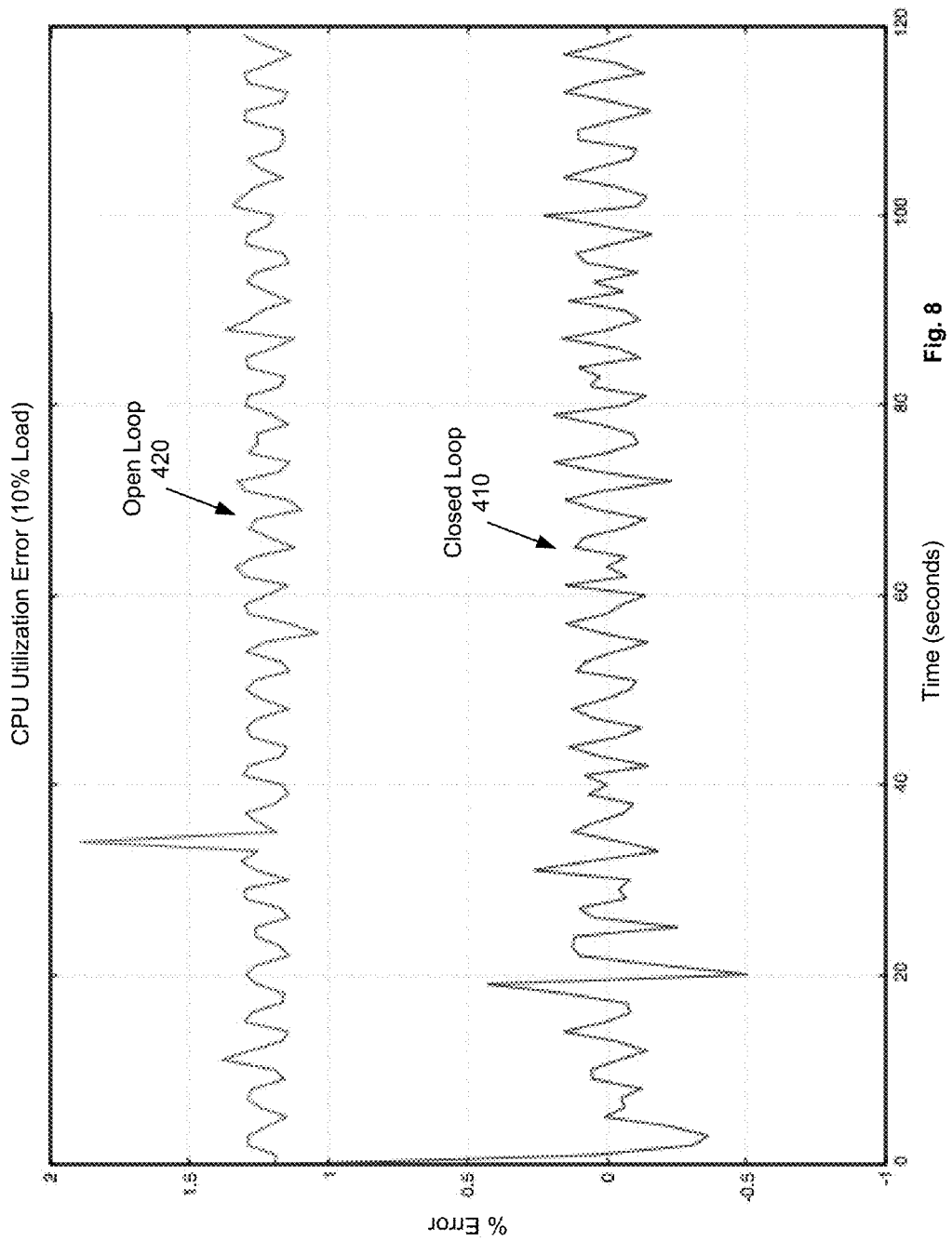
FIG. 8 is a graph showing the superior performance of a closed loop load generator over an open loop load generator over time.

FIG. 8 is a graph showing the superior performance of a closed loop load generator over an open loop load generator over time.

This graph shows an initial comparison of a naive CPU load generator (open loop 420) vs. the PID controlled CPU load generator (closed loop 410) over a 120 second duration at 10% CPU utilization. The x-axis represents time and the y-axis represents the observed error. In this case positive error represents insufficient CPU load and negative error represents excessive CPU load. Both controllers bounce around an average error value due to normal system variation. However, the average PID controlled error is clearly much closer to 0 than in the open loop case.

Figure 9:
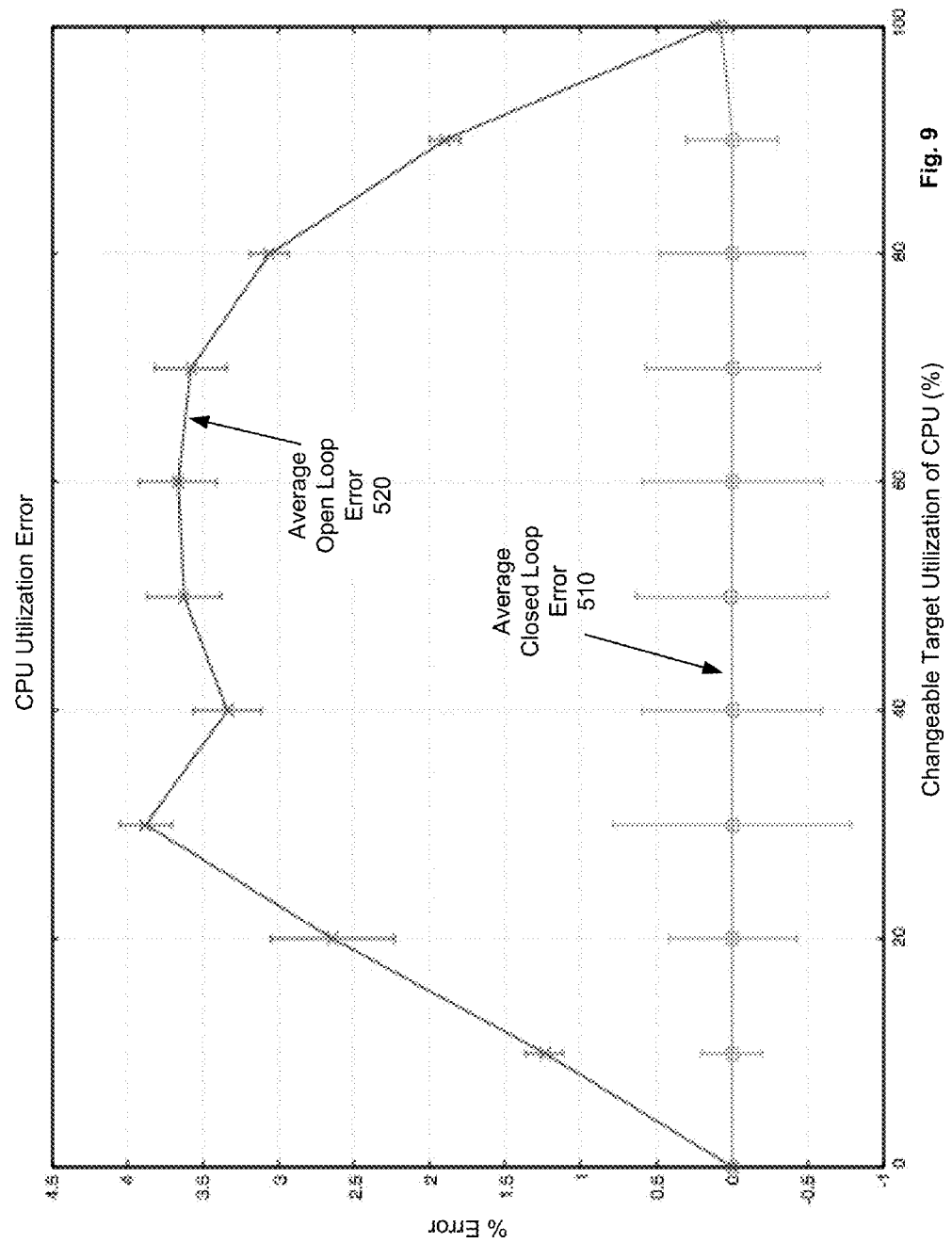
FIG. 9 is a graph showing the superior performance of a closed loop load generator over an open loop load generator over various changeable target utilizations of CPU.

FIG. 9 is a graph showing the superior performance of a closed loop load generator over an open loop load generator over various changeable target utilizations of CPU.

The same comparison as in FIG. 8 is made over a range of target CPU loads. This time, the x-axis is the target load and the y-axis is the average error value observed over the test duration. The error bars indicate the maximum and minimum error values observed during the test run. The average error value in nearly all PID controlled cases (closed loop 510) is 0, whereas the naive CPU generator (open loop 520) has a clear bias dependent on the target CPU load. Also, both generators performed nearly identically at 0% and 100% load.

Figure 10:
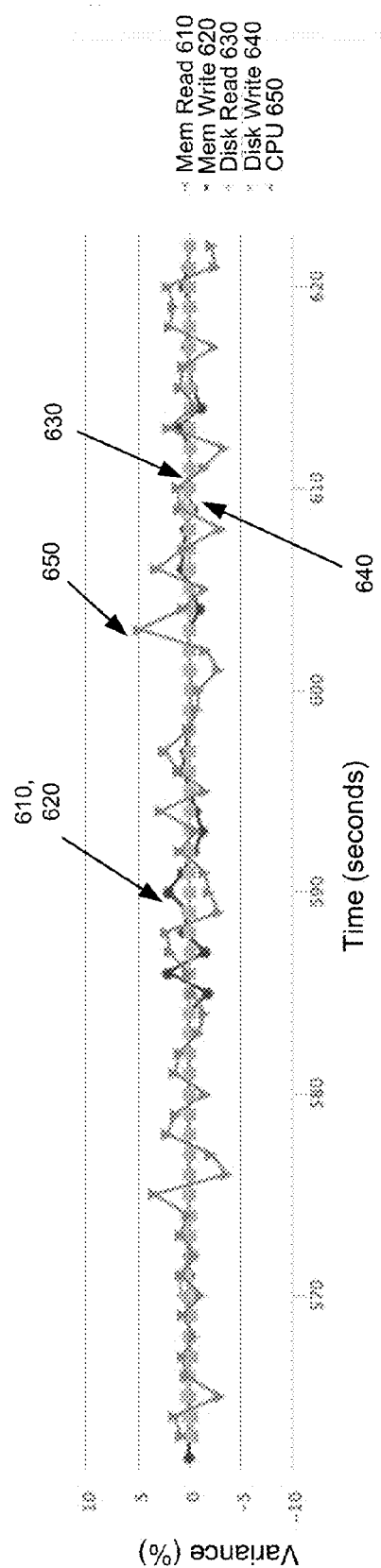
FIG. 10 is a graph showing the performance of multiple dimensions of computer resource load at the same time.

FIG. 10 is a graph showing the performance of multiple dimensions of computer resource load at the same time.

The graph shows the measured error (variance percentage in the graph) when running three load generators using the unikernel based load generator inside a virtual machine on a lightly loaded hypervisor.

The generators were configured as follows:
CPU utilization (trace 650): 50%
Memory Read (trace 610): 1000 MB/s
Memory Write (trace 620): 100 MB/s
Disk Read (trace 630): 20 MB/s
Disk Write (trace 640): 2 MB/s There is some variance in every result category, however the average error is 0. Additionally, this shows that multiple load generators can work together at the same time, to create an accurate load over time.

Figure 11:
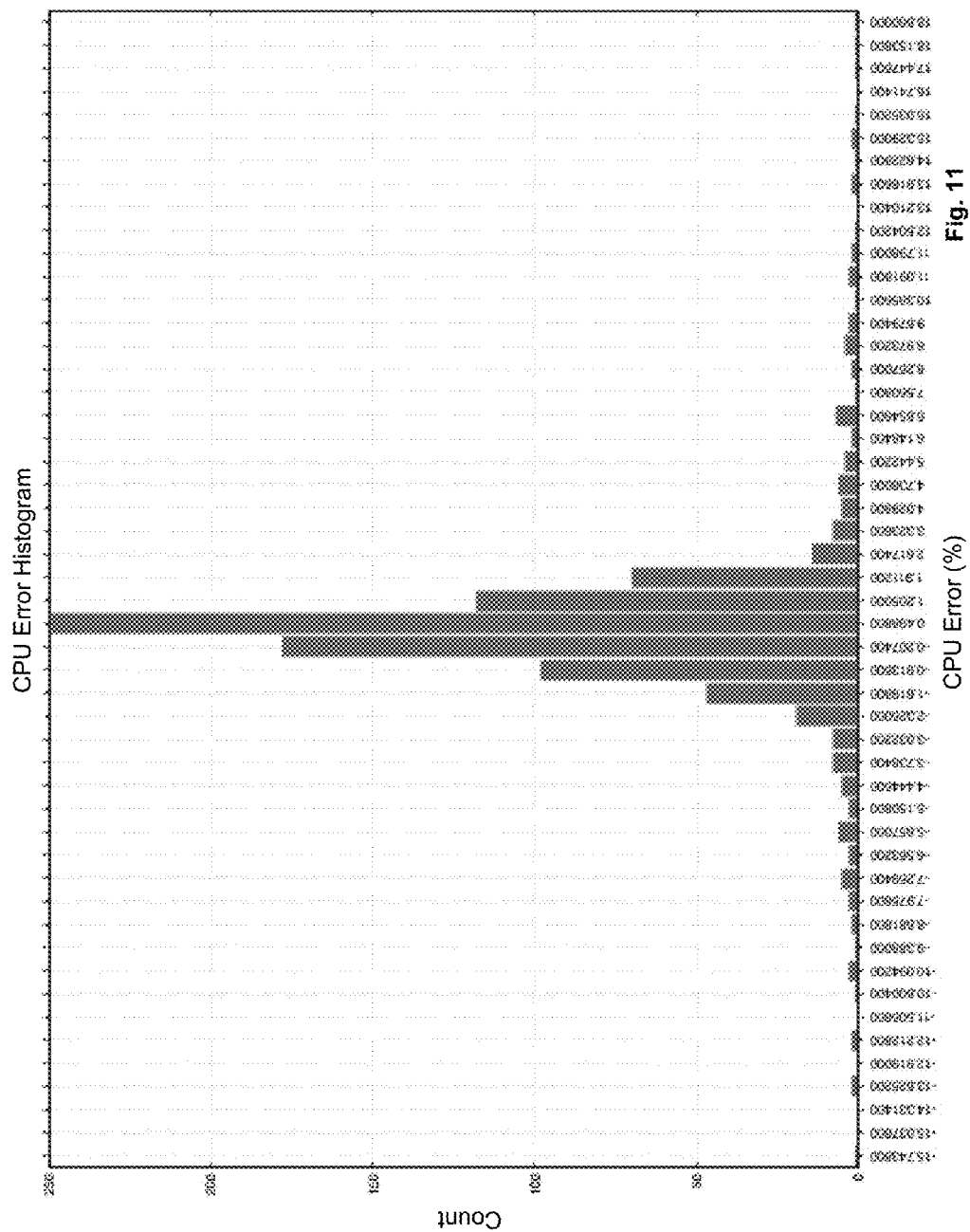
FIG. 11 is a histogram of CPU load error in a virtual machine with sufficient underlying resources.

FIG. 11 is a histogram of CPU load error in a virtual machine with sufficient underlying resources.

This load generation technique compares the ability of hypervisor platforms to provide a desired level of performance. By configuring a specific load on our test tool, the resource utilization test application can determine whether or not the hypervisor can provide that amount of compute resource to the test tool.

This first histogram shows the range of measured CPU load error for the unikernel based load generator on a lightly loaded hypervisor. The average error for this test run is 0% (as in the initial tests discussed above). Additionally, the histogram shows a tight clustering of error values around 0% error.

Figure 12:
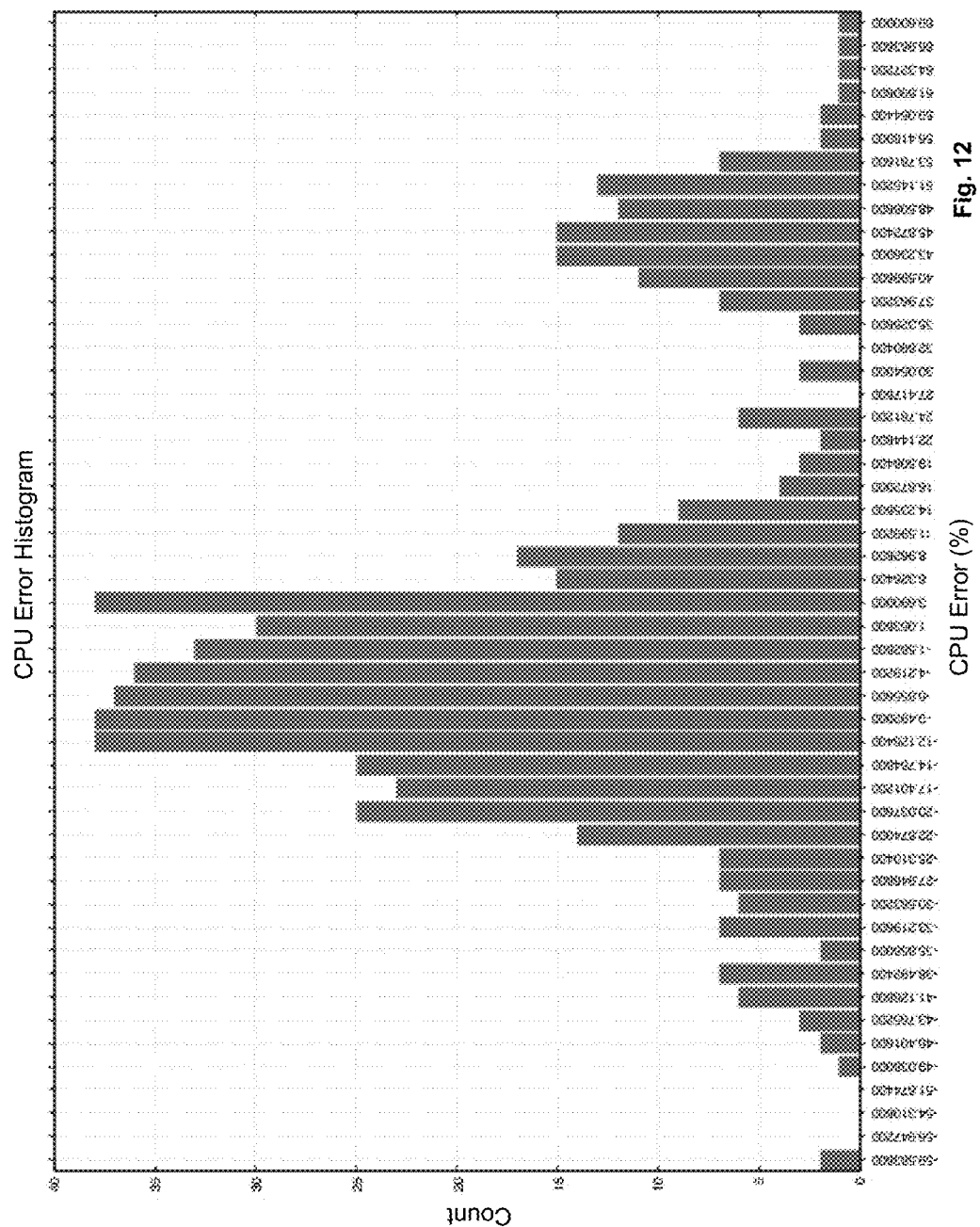
FIG. 12 is a histogram of CPU load error in a virtual machine with insufficient underlying resources.

FIG. 12 is a histogram of CPU load error in a virtual machine with insufficient underlying resources.

This second histogram shows the same test configuration, but run on an overloaded hypervisor. The measured error has a much larger variation on this test system. Additionally, the average error for this test run is ~−5%, which indicates that the PID controlled load generator could not generated the desired load due to a lack of CPU resources.

Figure 13:
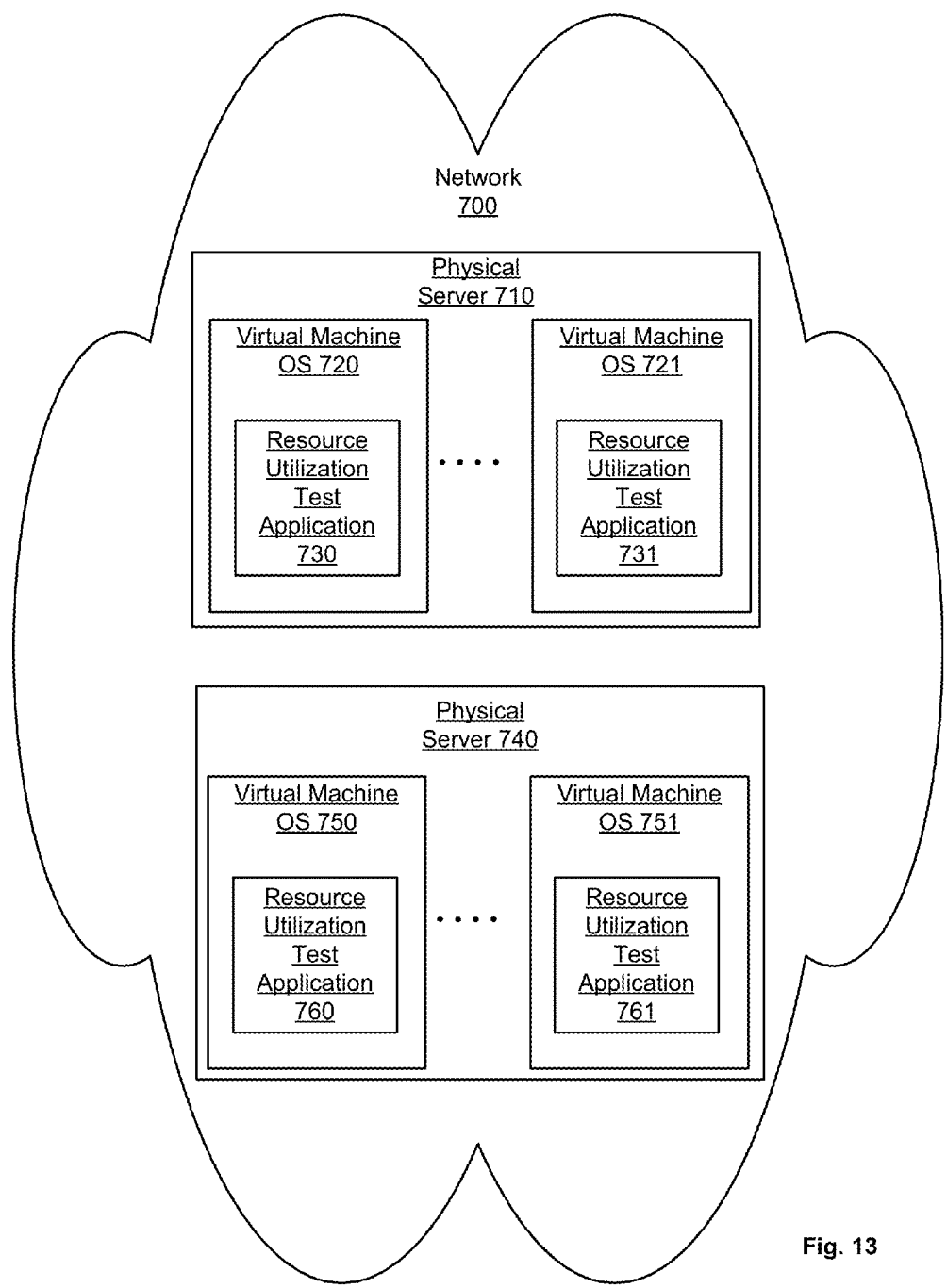
FIG. 13 is a simplified block diagram of a datacenter cloud with resource utilization test applications running in multiple instances of virtual machines on different physical servers.

FIG. 13 is a simplified block diagram of a datacenter cloud with resource utilization test applications running in multiple instances of virtual machines on different physical servers.

Network 700 includes multiple physical servers such as physical server 710 and physical server 740. Each physical server supports multiple virtual machine instances, such as virtual machine OS 720 and 721 on physical server 710, and virtual machine OS 750 and 751 on physical server 740. Each of the virtual machines supports a resource utilization test application, such as resource utilization test application 730, 731, 760, and 761 respectively on virtual machine OS 720, 721, 750, and 751. Although 2 virtual machines are shown in the example, each physical server can support an arbitrary number of virtual machines.

In one embodiment, control software remotely installs the resource utilization test applications (along with the virtual machines, unless the virtual machine was already installed). Then the control software runs all (or some subset) of the resource utilization test applications on all (or some subset) of the virtual machines on all (or some subset) of the physical serves and aggregates the results. The final output can indicate an aggregate capacity of the datacenter cloud supporting many virtual machines for different dimensions of computer load.

FIG. 14 is a block diagram of an example computer system, according to one implementation. Computer system 910 typically includes at least one processor 914 that communicates with a number of peripheral devices via bus subsystem 912. These peripheral devices may include a storage subsystem 924 including, for example, memory devices and a file storage subsystem, user interface input devices 922, user interface output devices 920, and a network interface subsystem 916. The input and output devices allow user interaction with computer system 910. Network interface subsystem 916 provides an interface to outside networks, including an interface to corresponding interface devices in other computer systems.

User interface input devices 922 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 910.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide a non-visual display such as audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules and methods described herein. These software modules are generally executed by processor 914 alone or in combination with other processors.

Memory 926 used in the storage subsystem can include a number of memories including a main random access memory (RAM) 930 for storage of instructions and data during program execution and a read only memory (ROM) 932 in which fixed instructions are stored. A file storage subsystem 928 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 928 in the storage subsystem 924, or in other machines accessible by the processor.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as one example. Many other configurations of computer system 910 are possible having more or fewer components than the computer system depicted in FIG. 9.

Particular Implementations

One aspect of the technology is a method of adjustably generating multiple dimensions of computer resource load to test capacity of the multiple dimensions of the computer resource load.

The method comprises, executing, on a first computer, a utilization test that generates the multiple dimensions of resource load on the first computer.

The multiple dimensions include at least two of: a processor utilization dimension, a main memory utilization dimension, a mass storage utilization dimension, and a network utilization dimension.

For each dimension of two or more of the multiple dimensions, the utilization test performs iterations of generating a load said each dimension of the resource load on the first computer, in an amount predicted to cause an actual utilization equal to a changeable target utilization of said each dimension on the first computer.

The utilization test measures the actual utilization of a particular one of the multiple dimensions during generation of the resource load on the first computer.

The actual utilization is a result of at least:

(i) load generated for the particular one of the multiple dimensions on the first computer. The load generated is generated by the utilization test.

(ii) a first utilization contribution to the particular one of the multiple dimensions on the first computer. The first utilization contribution is generated outside the utilization test and on the first computer.

Said particular one of the multiple dimensions of the resource load on the first computer is one of said two or more of the multiple dimensions, such that said particular one of the multiple dimensions of the resource load on the first computer has the changeable target utilization.

The utilization test adjusts the load generated to attempt realize and maintain the target utilization of the first computer for said particular one of the multiple dimensions by to correcting for an inequality between (i) the actual utilization resulting from the load generated and the first utilization contribution, and (ii) the changeable target utilization of the particular one of the multiple dimensions the first computer.

In one embodiment a subsequent one of the iterations is after a prior one of the iterations. In the prior one of the iterations the utilization test measures the actual utilization, and in response, in the subsequent one of the iterations the utilization test adjusts the load generated.

In one embodiment a subsequent one of the iterations is after a prior one of the iterations. In the prior one of the iterations the utilization test measures the actual utilization of the particular one of the multiple dimensions on the first computer, and in response, in the subsequent one of the iterations the utilization test adjusts the load generated for the particular one of the multiple dimensions on the first computer.

In one embodiment the actual utilization of the particular one of the multiple dimensions of the resource load on the first computer is the result of at least:

(i) the load generated, (ii) the first utilization contribution, and (iii) a second utilization contribution of another one of the multiple dimensions on the first computer. The second utilization contribution is generated by the utilization test for said another one of the multiple dimensions.

In one embodiment the particular one of the multiple dimensions on the first computer is the processor utilization dimension, and said another one of the multiple dimensions is any of the main memory utilization dimension, the mass storage utilization dimension, and the network utilization dimension.

In one embodiment the two or more of the multiple dimensions includes the particular one of the multiple dimensions and another one of the multiple dimensions on the first computer. The actual utilization measured by the utilization test for said another one of the multiple dimensions is a result of at least:

(i) load generated for said another one of the multiple dimensions of the resource load on the first computer. The load generated for said another one of the multiple dimensions is generated by the utilization test for said another one of the multiple dimensions; and (ii) another first utilization contribution on the first computer generated outside the utilization test on the first computer.

In one embodiment the utilization test has the ability to store different values of the changeable target utilization, the actual utilization, the load generated, and the first utilization contribution for different ones of the multiple dimensions of resource load on the first computer.

In one embodiment the multiple dimensions measure basic behavior of an OS.

In one embodiment the first computer is a physical computer.

In one embodiment the first computer is a virtual machine on a physical computer.

In one embodiment in the subsequent one of the iterations, the load generated is further adjusted to attempt to correct for the virtual machine undergoing changes in access to resources of the physical computer.

In one embodiment the utilization test runs in a unikernel operating system on the first computer.

In one embodiment the utilization test runs in a general purpose operating system.

In one embodiment the changeable target utilization is changeable to intermediate values in between full utilization and no utilization of the particular one of the multiple dimensions of the first computer.

In one embodiment the changeable target utilization for the different dimensions is varied over time, and the utilization test performs a new set of iterations responsive to the changeable target utilization being changed.

In one embodiment the changeable target utilization for the different dimensions is determined by a user.

In one embodiment the changeable target utilization for the different dimensions is determined by an algorithm automatically.

One embodiment further comprises:

reporting the actual utilization and a difference between the actual utilization and the changeable target utilization for the multiple dimensions.

In one embodiment the utilization test includes a PID controller loop with a PID controller output that causes an actual utilization for the multiple dimensions of resource load of the first computer, in an attempt to realize the changeable target utilization for the multiple dimensions of resource load of the first computer.

Another aspect of the technology is a method of adjustably generating multiple dimensions of computer resource load to test capacity of the multiple dimensions of the computer resource load.

The method comprises executing, on a first computer, a utilization test that generates the multiple dimensions of resource load on the first computer.

The multiple dimensions include at least two of: a processor utilization dimension, a main memory utilization dimension, a mass storage utilization dimension, and a network utilization dimension.

For each dimension of two or more of the multiple dimensions, the utilization test performs, with a PID controller, iterations of generating a load in said each dimension of the resource load on the first computer, in an amount predicted to cause an actual utilization equal to a changeable target utilization of said each dimension on the first computer.

Another aspect of the technology is an apparatus configured to adjustably generate multiple dimensions of computer resource load to adjustably test availability of multiple dimensions of computer resource load, comprising a first computer that includes a processor, memory, and instructions in the memory that implement a method as described herein.

Another aspect of the technology is a non-transitory computer-readable medium storing code for adjustably generating multiple dimensions of computer resource load to test capacity of the multiple dimensions of the computer resource load. The code comprises instructions for performing a method as described herein.

This method and other implementations of the technology disclosed can include one or more of the following features and/or features described in connection with additional methods disclosed. In the interest of conciseness, the combinations of features disclosed in this application are not individually enumerated and are not repeated with each base set of features.

Other implementations may include tangible computer-readable memory including computer program instructions that cause a computer to implement any of the methods described above. Yet another implementation may include a system including memory and one or more processors operable to execute instructions, stored in the memory, to perform any of the methods described above.

While the technology disclosed is by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the technology disclosed and the scope of the following claims.

The invention claimed is:

1. A method of adjustably generating multiple dimensions of computer resource load to test capacity of the multiple dimensions of the computer resource load, the method comprising:

executing, on a first computer, a utilization test that generates the multiple dimensions of resource load on the first computer, the multiple dimensions including at least two of:

a processor utilization dimension, a main memory utilization dimension, a mass storage utilization dimension, and a network utilization dimension, wherein, for each dimension of two or more of the multiple dimensions, the utilization test performs iterations of generating a load in said each dimension of the resource load on the first computer, in an amount predicted to cause an actual utilization equal to a changeable target utilization of said each dimension on the first computer, wherein the utilization test measures the actual utilization of a particular one of the multiple dimensions during generation of the resource load on the first computer, the actual utilization being a result of at least:
  a load generated for the particular one of the multiple dimensions on the first computer, as generated by the utilization test; and
  a first utilization contribution to the particular one of the multiple dimensions on the first computer, wherein the first utilization contribution is generated outside the utilization test and on the first computer, and
wherein the utilization test adjusts the generated load to attempt to realize and maintain the target utilization on the first computer for said particular one of the multiple dimensions by correcting for an inequality between (i) the actual utilization resulting from the load generated and the first utilization contribution, and (ii) the changeable target utilization of the particular one of the multiple dimensions on the first computer.

2. The method of claim 1, wherein a subsequent one of the iterations is after a prior one of the iterations, in the prior one of the iterations the utilization test measures the actual utilization, and in response, in the subsequent one of the iterations the utilization test adjusts the load generated.

3. The method of claim 1, wherein a subsequent one of the iterations is after a prior one of the iterations, in the prior one of the iterations the utilization test measures the actual utilization of the particular one of the multiple dimensions on the first computer, and in response, in the subsequent one of the iterations the utilization test adjusts the load generated for the particular one of the multiple dimensions on the first computer.

4. The method of claim 1, wherein the actual utilization of the particular one of the multiple dimensions on the first computer is the result of at least:
  the load generated;
  the first utilization contribution; and
  a second utilization contribution of another one of the multiple dimensions on the first computer, the second utilization contribution generated by the utilization test for said another one of the multiple dimensions.

5. The method of claim 4, wherein the particular one of the multiple dimensions on the first computer is the processor utilization dimension, and said another one of the multiple dimensions is any of the main memory utilization dimension, the mass storage utilization dimension, and the network utilization dimension.

6. The method of claim 1, wherein the two or more of the multiple dimensions includes the particular one of the multiple dimensions and another one of the multiple dimensions on the first computer, and the actual utilization measured by the utilization test for said another one of the multiple dimensions is a result of at least:
  a load generated for said another one of the multiple dimensions on the first computer, the load generated for said another one of the multiple dimensions generated by the utilization test for said another one of the multiple dimensions; and
  another first utilization contribution on the first computer generated outside the utilization test on the first computer.

7. The method of claim 1, wherein the utilization test has the ability to store different values of the changeable target utilization, the actual utilization, the load generated, and the first utilization contribution for different ones of the multiple dimensions of resource load on the first computer.

8. The method of claim 1, wherein the multiple dimensions measure basic behavior of an operating system (OS).

9. The method of claim 1, wherein the first computer is a physical computer.

10. The method of claim 1, wherein the first computer is a virtual machine on a physical computer.

11. The method of claim 10, wherein in a subsequent one of the iterations, the load generated is further adjusted to attempt to correct for the virtual machine undergoing changes in access to resources of the physical computer.

12. The method of claim 1, wherein the utilization test runs in a unikernel operating system on the first computer.

13. The method of claim 1, wherein the utilization test runs in a general purpose operating system.

14. The method of claim 1, wherein the changeable target utilization is changeable to intermediate values in between full utilization and no utilization of the particular one of the multiple dimensions of the first computer.

15. The method of claim 1, wherein the changeable target utilization for the different dimensions is varied over time, and the utilization test performs a new set of iterations responsive to the changeable target utilization being changed.

16. The method of claim 1, wherein the changeable target utilization for the different dimensions is determined by a user.

17. The method of claim 1, wherein the changeable target utilization for the different dimensions is determined by an algorithm automatically.

18. The method of claim 1, further comprising:
  reporting the actual utilization and a difference between the actual utilization and the changeable target utilization for the multiple dimensions.

19. The method of claim 1, wherein the utilization test includes a proportional plus integral plus derivative (PID) controller loop with a PID controller output that causes an actual utilization for the multiple dimensions of resource load of the first computer, in an attempt to realize the changeable target utilization for the multiple dimensions of resource load of the first computer.

20. A method of adjustably generating multiple dimensions of computer resource load to test capacity of the multiple dimensions of the computer resource load, the method comprising:
  executing, on a first computer, a utilization test that generates the multiple dimensions of resource load on the first computer, the multiple dimensions including at least two of:
    a processor utilization dimension, a main memory utilization dimension, a mass storage utilization dimension, and a network utilization dimension,
  wherein, for each dimension of two or more of the multiple dimensions, the utilization test performs, with a proportional plus integral plus derivative (PID) controller, iterations of generating a load in said each dimension of the resource load on the first computer, in an amount predicted to cause an actual utilization equal to a changeable target utilization of said each dimension on the first computer while continuously adjusting the generated load to compensate for a first utilization contribution that is generated outside the utilization test and on the first computer.

21. An apparatus configured to adjustably generate multiple dimensions of computer resource load to adjustably test availability of multiple dimensions of computer resource load, comprising:
  a first computer that includes a processor, memory, and instructions in the memory that implement:

executing, on a first computer, a utilization test that generates the multiple dimensions of resource load on the first computer, the multiple dimensions including at least two of:
   a processor utilization dimension, a main memory utilization dimension, a mass storage utilization dimension, and a network utilization dimension,
   wherein, for each dimension of two or more of the multiple dimensions, the utilization test performs iterations of generating a load in said each dimension of the resource load on the first computer, in an amount predicted to cause an actual utilization equal to a changeable target utilization of said each dimension on the first computer,
   wherein the utilization test measures the actual utilization of a particular one of the multiple dimensions during generation of the resource load on the first computer, the actual utilization being a result of at least:
      a load generated for the particular one of the multiple dimensions on the first computer, as generated by the utilization test; and
      a first utilization contribution to the particular one of the multiple dimensions on the first computer, wherein the first utilization contribution is generated outside the utilization test and on the first computer, and
   wherein the utilization test adjusts the generated load to attempt to realize and maintain the target utilization on the first computer for said particular one of the multiple dimensions by correcting for an inequality between (i) the actual utilization resulting from the load generated and the first utilization contribution, and (ii) the changeable target utilization of the particular one of the multiple dimensions on the first computer.

22. An apparatus configured to adjustably generate multiple dimensions of computer resource load to test capacity of the multiple dimensions of the computer resource load, comprising:
   a first computer that includes a processor, memory, and instructions in the memory that implement:
      executing, on a first computer, a utilization test that generates the multiple dimensions of resource load on the first computer, the multiple dimensions including at least two of:
         a processor utilization dimension, a main memory utilization dimension, a mass storage utilization dimension, and a network utilization dimension,
      wherein, for each dimension of two or more of the multiple dimensions, the utilization test performs, with a proportional plus integral plus derivative (PID) controller, iterations of generating a load in said each dimension of the resource load on the first computer, in an amount predicted to cause an actual utilization equal to a changeable target utilization of said each dimension on the first computer while continuously adjusting the generated load to compensate for a first utilization contribution that is generated outside the utilization test and on the first computer.

23. A non-transitory computer-readable medium storing code for adjustably generating multiple dimensions of computer resource load to test capacity of the multiple dimensions of the computer resource load, the code comprising:
   instructions for executing, on a first computer, a utilization test that generates the multiple dimensions of resource load on the first computer, the multiple dimensions including at least two of:
      a processor utilization dimension, a main memory utilization dimension, a mass storage utilization dimension, and a network utilization dimension,
   wherein, for each dimension of two or more of the multiple dimensions, the utilization test performs iterations of generating a load in said each dimension of the resource load on the first computer, in an amount predicted to cause an actual utilization equal to a changeable target utilization of said each dimension on the first computer,
   wherein the utilization test measures the actual utilization of a particular one of the multiple dimensions during generation of the resource load on the first computer, the actual utilization being result of at least:
      a load generated for the particular one of the multiple dimensions on the first computer, as generated by the utilization test; and
      a first utilization contribution to the particular one of the multiple dimensions on the first computer, wherein the first utilization contribution is generated outside the utilization test and on the first computer, and
   wherein the utilization test adjusts the generated load to attempt to realize and maintain the target utilization on the first computer for said particular one of the multiple dimensions by correcting for an inequality between (i) the actual utilization resulting from the load generated and the first utilization contribution, and (ii) the changeable target utilization of the particular one of the multiple dimensions on the first computer.

24. A non-transitory computer-readable medium storing code for adjustably generating multiple dimensions of computer resource load to test capacity of the multiple dimensions of the computer resource load, the code comprising:
   instructions for executing, on a first computer, a utilization test that generates the multiple dimensions of resource load on the first computer, the multiple dimensions including at least two of:
      a processor utilization dimension, a main memory utilization dimension, a mass storage utilization dimension, and a network utilization dimension,
   wherein, for each dimension of two or more of the multiple dimensions, the utilization test performs, with a proportional plus integral plus derivative (PID) controller, iterations of generating a load in said each dimension of the resource load on the first computer, in an amount predicted to cause an actual utilization equal to a changeable target utilization of said each dimension on the first computer.

* * * * *